United States Patent Office 3,437,208
Patented Apr. 8, 1969

3,437,208
APPARATUS FOR DYNAMIC FILTRATION
OF LIQUIDS
Jan Kaspar, 1332 Ukostelicka, Josef Soudek, 1293
Sezemicka, and Karel Gutwirth, 116 Strassova, all
of Pardubice, Czechoslovakia
Filed Oct. 21, 1964, Ser. No. 405,547
Int. Cl. B01d 33/02
U.S. Cl. 210—297                                      2 Claims

ABSTRACT OF THE DISCLOSURE

A method and apparatus for the dynamic filtration of liquids having solid particles suspended therein. The liquid is passed through a filter diaphragm from one side to the other side thereof so that solid particles continuously cling to the one side of the filter diaphragm. The liquid on the one side of the filter diaphragm is continuously agitated whereby the particles clinging to the filter diaphragm are continuously removed and returned into suspension, thus serving to produce on the one side of the filter diaphragm a thickened thixotropic slurry.

---

This invention relates to an apparatus for the dynamic filtration of liquids having solid particles suspended therein.

The filtration of such liquids, or slurries, has heretofore been carried out on a commercial scale by means of pressure filters of various types, such as filter presses, continuous drum pressure filters, belt pressure filters, and automatic filter presses.

Such devices, while certainly not inoperable, are subject to a variety of drawbacks which render the filtration process relatively uneconomical. Firstly, the initial investment cost is high, as are the operating expenses. In the case of filter presses there is the added disadvantage of high manitenance costs due to excessive wear of operating components such as filter cloth; in the case of continuously operating filters difficulties are encountered with the discharge of the filter cake, the stretching and propelling of the filter cloth, and the sealing of moveable parts against the introduction of contaminants.

The most serious drawback, however, is the low capacity of all of these devices, relative to the usable filtration surface. This is a result of the reduction in efficiency caused by the formation of the filter cake on the filter surface.

These difficulties are inherent in the mechanism of filtration and washing. Assuming a filtration process under constant pressure, the relation between the volume of the filtrate passed through the device, and the time may be expressed as follows:

$$(V+V_0)^2 = C(t+t_0)$$

where the constants $V_0$ and $t_0$ stand for the qualities of the filtration diaphragm and the constant C indicates the quality of the filtration cake and filtrate and an influence of pressure. Since the thickness of the cake is directly dependent upon the quantity of filtrate passing through the device, it is possible to express the relation between the cake thickness S and filtration rate $v$ on the basis of the above relationship.

In order to obtain as high a degree of purity as possible, it is often necessary to wash the cake with a wash liquid. As a rule the washing process proceeds at a constant rate of flow of the wash liquid. The time of washing depends on the desired degree of removal of soluble substance. Ideally, the initial wash should utilize recycled wash liquid already containing a certain percentage of the soluble substance, particularly in the case of the continuously operating filtration devices. As the washing process progresses through the various stages, pure new fluid may be added to the recycled solution and pure washing liquid may be used exclusively for the final stage.

With discontinuous apparatus this washing method will require a series of large-volume storage vessels and constant supervision by an operator. With continuous apparatus, on the other hand, it is necessary to divide the washing operation into several stages which is no less troublesome and costly. It is for these reasons that the recycling of previously used wash liquids is generally dispensed with and that, as a rule, washing is carried out with new and pure liquids only. Naturally, the constant addition of fresh liquid instead of the recycling of filtrate increases the total quantity to be discarded. Where harmful substances which cannot be freely discharged, e.g. into waterways, are to be removed from the filter cake by washing, the neutralization of the wash then becomes excessively burdensome and expensive in view of the great volume of liquid involved.

It is thus a general object of the invention to provide an apparatus for the filtration of slurries which is not subject to the aforementioned disadvantages.

A more specific object of the invention is to provide an apparatus of greater efficiency and economy of operation than those heretofore known.

Yet a more specific object of the invention is to eliminate the need for washing of a filter cake and, in fact, to eliminate the formation of a filter cake per se.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
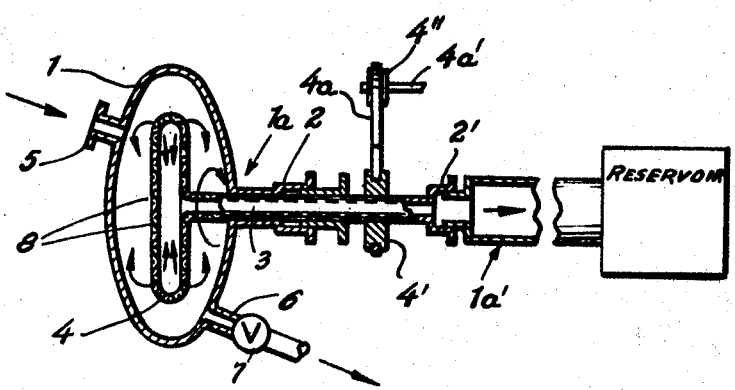
FIG. 3 is a schematic view, partly in section, of the embodiment of the apparatus of the invention.
Figure 4:
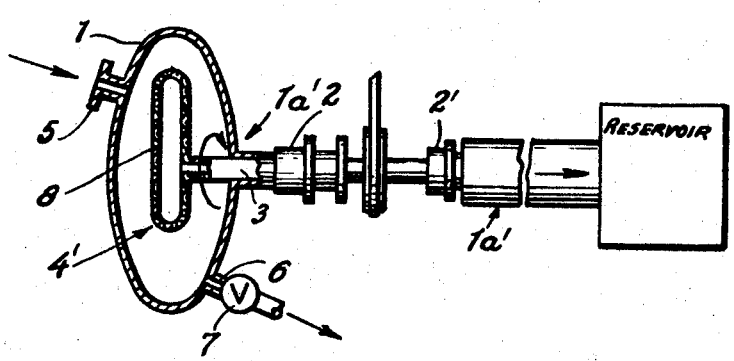
Figure 5:
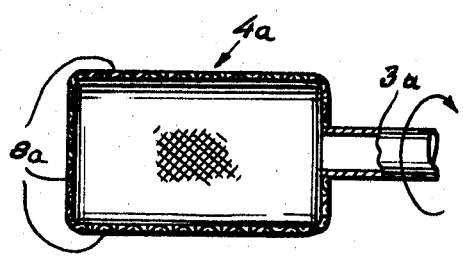
Figure 6:
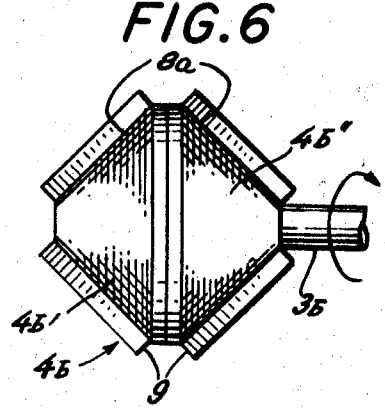
Figure 7:
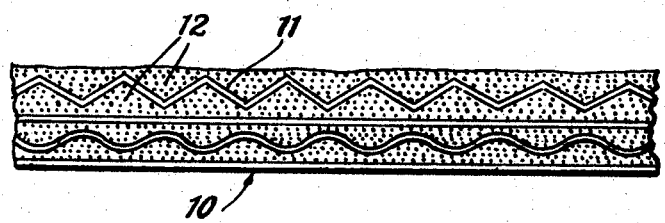
Figure 8:
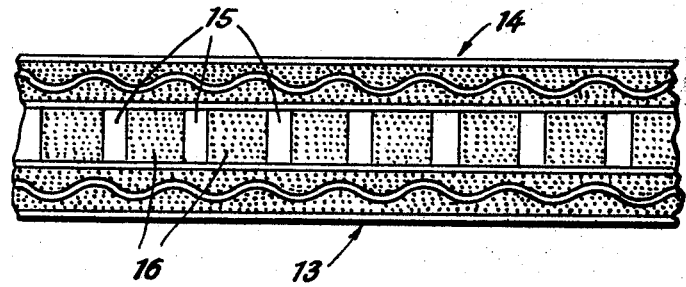
Figure 9:
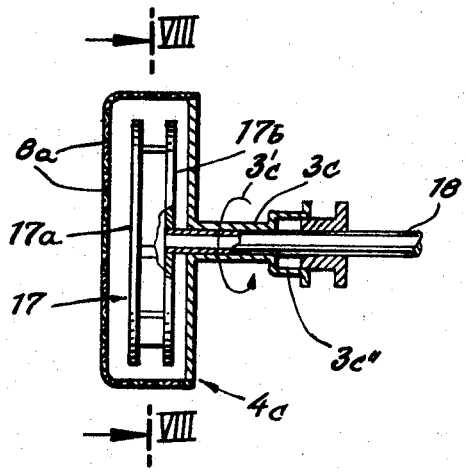
Figure 10:
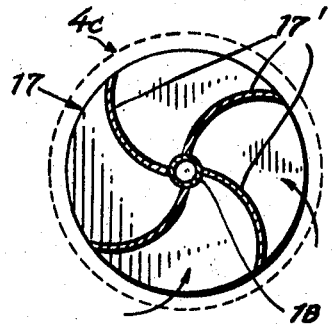
Figure 11:
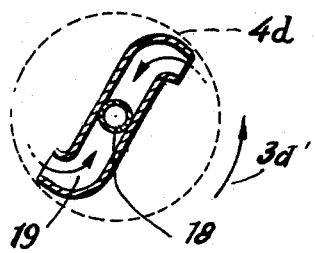
Figure 12:
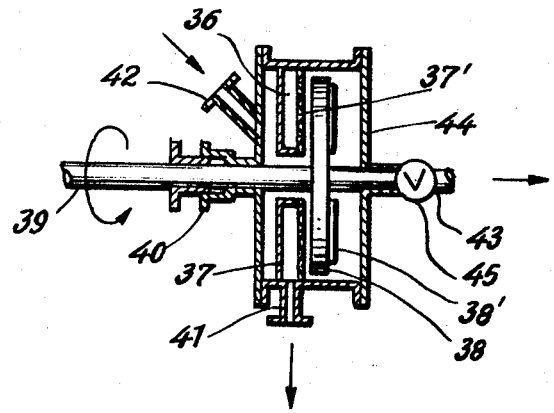
Figure 13:
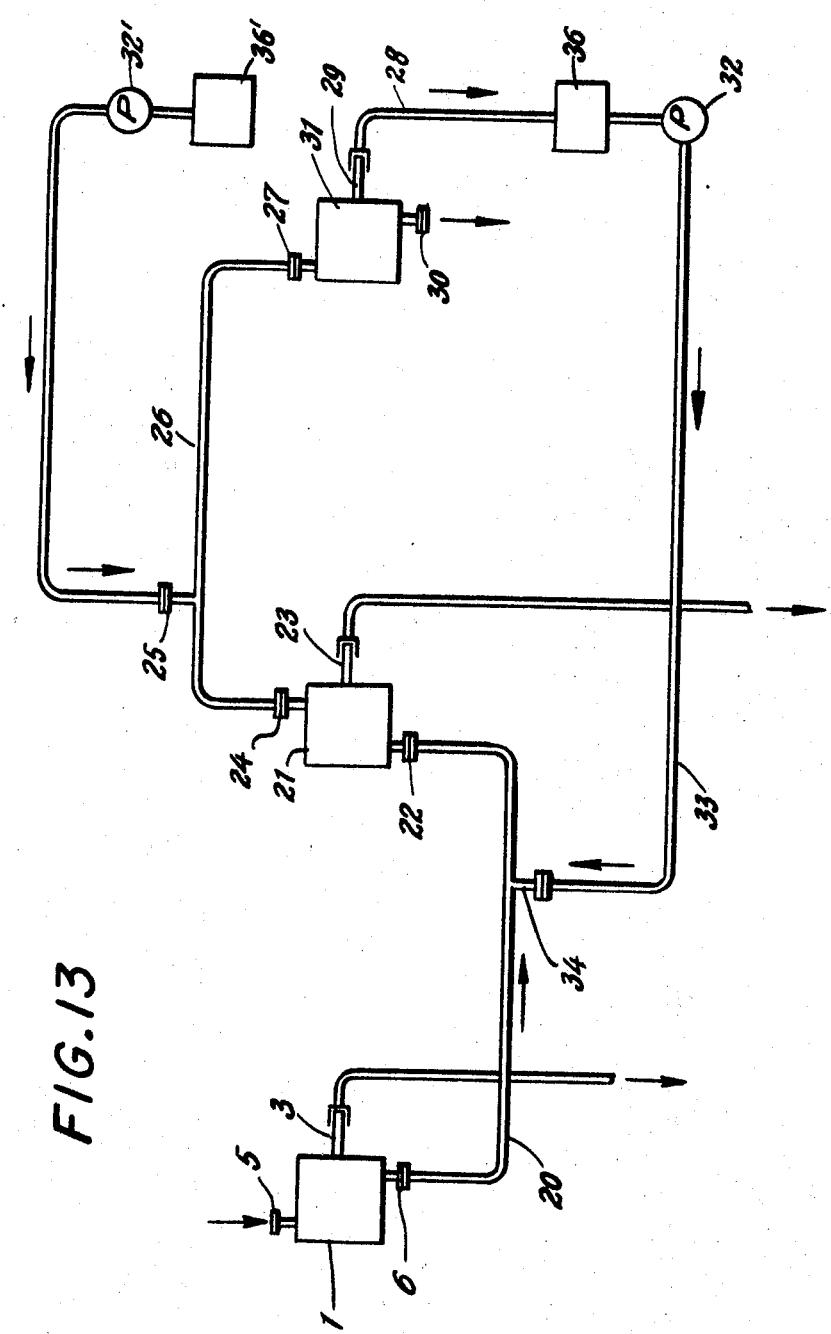
Figure 14:
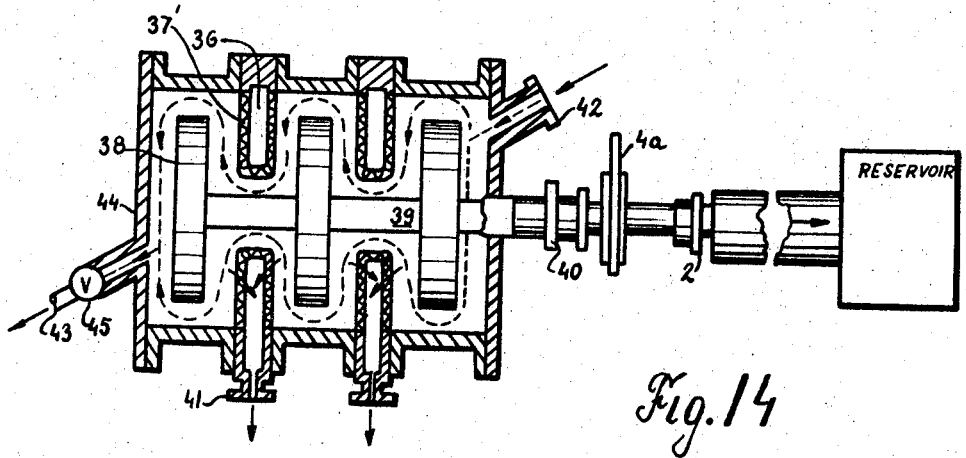
Figure 15:
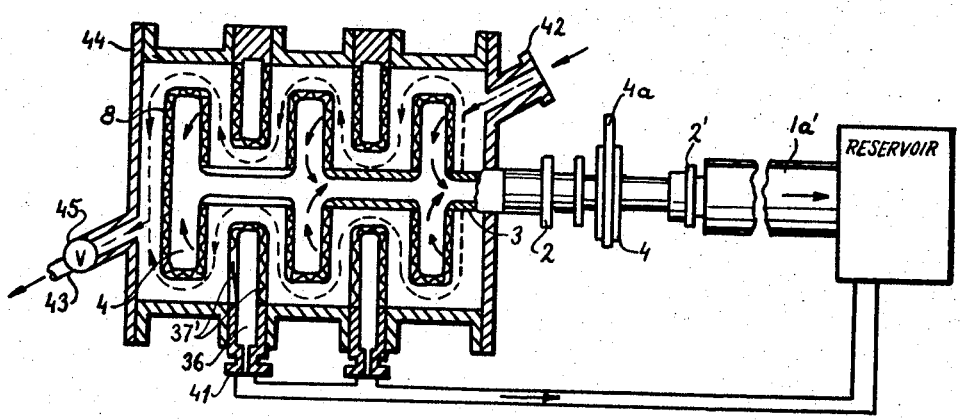
Figure 16:
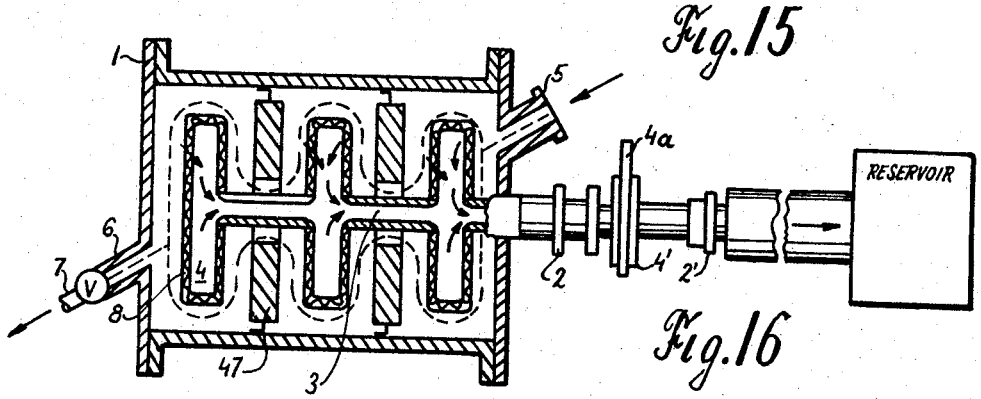

FIG. 4, in a view generally similar to that of FIG. 3, shows a modification of that figure;

FIG. 5 is an elevational view of a modified filter body;

FIG. 6 is an elevational view of yet another modified filter body;

FIGS. 7 and 8 are sectional views of embodiments of the diaphragm used in conjunction with the filter bodies shown in FIGS. 3–6;

FIG. 9 is an elevational view, partly in section, of a device for discharging the filtrate from the filter body;

FIG. 10 is a section taken on the line VIII—VIII of FIG. 9;

FIG. 11 is a modification of the embodiment in FIG. 10 in partial section;

FIG. 12 is a sectional elevation of yet another embodiment of the apparatus according to the invention;

FIG. 13 is a schematic view of an apparatus embodying the invention and providing for multiple filtration and washing stages;

FIG. 14 is a schematic view of another possible embodiment of the apparatus according to the invention, which consists of two hollow filtration bodies and of three solid impellers;

FIG. 15 is a schematic view of a further embodiment of the apparatus according to the invention, consisting of two hollow filtration bodies and of three hollow impellers; and FIG. 16 is a schematic view of an embodiment comprising two stationary solid bodies and three hollow impellers acting as filtration bodies.

In attempting to arrive at a more economical and satisfactory method of filtration we have found that approximately 20% to 30% by volume of slurry is retained in the form of a filter cake, that is, a mass of filtered-out solid particles having thixotropic properties. A paste or gel is said to be thixotropic if, upon agitation, it becomes fluid. If, now, the formation of a filter cake and the concomitant reduction in the flow of the slurry can be prevented, the efficiency of a filter device can be increased sharply. It has been found that under such conditions the concentration of solids in the thickened slurry remaining after filtration will be higher by 10% to 20% than that obtained during identical filtration periods using other previously known methods.

Based on this realization the invention provides that the filter cake which normally would be formed on the filter diaphragm, is continuously fully or partly removed from the diaphragm and readmixed with the slurry. The removal of the filter cake is advantageously accomplished by agitating the mixture of original slurry and the admixed particles at a rate suitable for keeping it liquefied and, if necessary, by an addition of from 5% to 50% by volume of solid particles of a size at least 5 times that of the particles contained in the original slurry. The viscosity can be decreased and the desired fluidity attained by addition of a suitable surface-active substance such as for example $K_4P_2O_5$.

Figure 1:
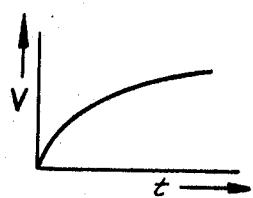
FIG. 1 is a graphic representation of the specific relation between the volume V of filtrate and the time $t$.
Figure 2:
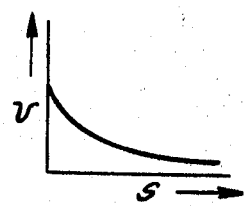
FIG. 2 is a graphic representation of the relation between the filtration cake thickness S and the filtration rate $v$.

Turning now to the drawings, FIGS. 1 and 2 will be seen to be self-explanatory. FIG. 3 represents an embodiment of the apparatus of our invention. A pressure vessel 1 is provided with an opening 1a through which passes a hollow shaft or conduit 3; a stuffing box 2 tightly seals the conduit 1a against fluid leakage. A hollow filter body 4 is secured to the end of conduit 3 within the pressure vessel 1. An inlet 5 provides for the introduction of slurry into the pressure vessel from a supply not shown; an outlet 6 permits the discharge from the vessel 1 of thickened slurry. The outlet 6 is provided with a uni-directional valve 7 controlling the passage out of the vessel of the thickened slurry. One or more diaphragms 8 are secured to the hollow body 4 and permit passage of liquid thereinto while holding back solid particles suspended in the liquid or slurry surrounding the body 4. Exteriorly of the pressure vessel 1 and at a location longitudinally spaced from the stuffing box 2 the conduit is provided with a pulley 4' rigidly secured thereon. Pulley 4', and thereby shaft 3, is driven via belt 4a and a second pulley 4" secured on a shaft 4a' by conventional means. Beyond pulley 4', that is longitudinally spaced from it, shaft 3 communicates with a stationary conduit 1a' via second stuffing box 2'. Conduit 1a' in turn communicates with a remotely located reservoir not designated by a reference numeral, or may open directly to the atmosphere.

In operation, a slurry is continuously fed into the pressure vessel 1 via the inlet 5 at a constant rate of flow. Driven via the pulley 4' shaft 3 and with it the hollow body 4 rotate; the slurry is thus continuously and intensively agitated. Liquid contained in the slurry filters through a diaphragm 8 into the interior of the body 4 while solid particles are restrained by the diaphragm and returned into suspension as a result of the continuous agitation. It will be understood that the continuous feeding of new slurry through the intake 5 creates in the vessel 1 a pressure in excess of that prevailing in the conduit 3. This pressure differential is so selected that it is sufficient to overcome the centrifugal forces set up by rotation of hollow body 4 and is thus able to force the filtered liquid, or filtrate, in the body 4 to flow through the conduit 3 and out of the housing. Valve 7, situated in outlet 6, remains closed until optimum concentration of slurry prevails in vessel 1. During the course of the subsequent operation this valve is actuated in any suitable manner with a view toward keeping the concentration constant.

It will be understood that such a vessel may be disposed either vertically or horizontally and that its shape may be varied considerably, the latter being primarily determined by the configuration selected for the hollow body 4.

To increase the agitation of the slurry in the vessel 1 the body 4 may be eccentrically mounted for rotation as shown in FIG. 4 which is otherwise the same as the embodiment of FIG. 3.

As mentioned, the configuration of the body 4 may be varied. FIG. 5, for example, shows the body 4a to be cylindrical and its surfaces to be substantially constituted by a plurality of diaphragms 8a. Again, as indicated in FIG. 6 the body 4b may consist of a pair of substantially conical elements 4b' and 4b", secured to a shaft 3b and joined together at their bases. It is of course also possible to dispose a series of such bodies within a vessel 1. To further increase the agitation effect all of these bodies may be provided on their exterior surfaces with ribs, vanes or the like designated in FIG. 6 by reference numeral 9.

FIGS. 7 and 8 illustrate, by way of example, some possible embodiments of the diaphragm 8. In the embodiment of FIG. 7 the diaphragm consists of an inner filter member 10 and an outer filter member 11 overlying member 10 in contiguous relationship. The interstices of outer member 11 are so selected as to be larger than those of inner member 10. As a result, the coarser particles filtered out of the liquid are now retained in the spaces 12 of outer member 11 where they build up into a layer which provides supplementary filtration and assures that only substantially completely filtered liquid will pass into the body 4.

The diaphragm illustrated in FIG. 8 is based on the same consideration. Here the inner member 13 and the outer member 14 are spaced apart by a series of spacers 15, thus creating between the two members a number of compartments 16 in which particles may be entrapped as described herebefore.

As previously mentioned the filtrate may be removed from the body 4 by setting up a pressure differential between the interior of vessel 1 and the reservoir remote therefrom.

It is also possible, however, to use mechanical means for help in overcoming the centrifugal force created by the rotation of body 4. A device of this type is shown in FIG. 9. Mounted within the hollow body 4c is a deflector 17 consisting of two parallel walls 17a and 17b separated, as seen in the sectional detail of FIG. 10, by radially outwardly curved deflector members 17'. Deflector 17 is fixedly secured to a stationary hollow shaft 18 which extends through conduit 3c. The latter, which rotates in the direction of the arrow 3c', is tightened by a stuffing box 3c". The hollow shaft 18 communicates by conduit not shown with reservoir also not shown. Since the members 17' curve in a direction oppositely that of the direction of rotation of the body 4c, and since the deflector 17 is open on its periphery the filtrate, which is forced radially outwardly by the rotation, is swept into the deflector 17 in the direction of the arrows in FIG. 10, and thus enters hollow shaft 18. A modification of this embodiment is shown in FIG. 11 where deflector 17 is replaced by a generally S-shaped tubular deflector member 19 which also is fixed rigidly to the stationary hollow shaft 18. It will be seen that the open ends of member 19 are curved in a direction opposite that of the rotation of body 14 with the result that again the filtrate is forced to enter the member 19 and is thus forcibly conveyed to and through the hollow shaft 18. The rotation of the body 4d is indicated by the arrow 3d'.

Yet another embodiment of the inventive apparatus is shown in FIG. 12. A pressure vessel 44 is here provided with an annular hollow filter body 36 secured to the inside of the peripheral wall of the vessel 44. Vessel 44 is cylindrical and the body 36 is secured adjacent one of the end faces of vessel 44 and parallel thereto. A shaft 39 extends through the adjacent wall of vessel 44 and through the center of hollow body 36; secured on the shaft 39 with axial spacing from body 36 is an impeller disc 38. Shaft 39 with the disc 38 is rotatable in the direction of the arrow by any conventional means not further shown. On its side 37 adjacent the end wall of vessel 44 the hollow body 36 is impervious to liquids; on the other side facing the disc 38 it carries one or more diaphragms 37'.

An inlet 42 in the end wall of vessel 44 adjacent side 37 of body 36 permits the introduction into the vessel of a slurry; an outlet 41 communicating with the body 36 permits the removal of the filtrate. Finally, a further outlet 43 in the other end wall of vessel 44 opposite the disc 38 provides for the removal of thickened slurry. This outlet is controlled by a unidirectional valve 45. To provide for increased agitation of the slurry contained in vessel 44 disc 38 may carry a plurality of ribs or vanes 38' on at least one of its faces.

In operation, the apparatus of this embodiment receives a constant stream of slurry to be filtered via the inlet 42. This slurry passes through the space between shaft 39 and the central opening of hollow body 36 and flows radially outwardly between the diaphragms 37' of hollow body 36 and the disc 38. Liquid from the slurry enters body 36 through the diaphragm and is evacuated from the body through the outlet 41. Particles tending to settle on the diaphragm 37' are continuously dislodged by the agitated slurry and are thus returned into suspension. Shear forces set up in the slurry cause it to be shifted in layers, this shift being proportional to the peripheral velocity and inversely proportional to the width of the gap between the hollow body 36 and the rotating disc 38. The disc may, of course, be replaced by any other suitable means, such as an agitator arm.

It will be clear that it is possible to combine the embodiments of FIGS. 3 and 12. In such a case, a number of stationary bodies 36 may be secured in a pressure vessel and may alternate with a number of rotating bodies 4 mounted on a conduit 39; the bodies 4 would then simultaneously act as filter bodies and would also take over the agitating function of the disc 38 in FIG. 12. It is also possible to replace the bodies 36 by full annular bodies without a diaphragm, which will be in the pressure vessel alternate with a member of rotating bodies 4 mounted on the conduit 39. Such embodiments are illustrated by way of example in FIGURES 14 and 15. The filtration apparatus according to FIG. 14 consists of two hollow filtration bodies 36 provided with diaphragms 37 on both sides and of three discs 38 secured to the shaft 39. The other apparatus parts correspond to those illustrated in FIG. 12. The function of this apparatus is the same as that of the apparatus in FIG. 12, and need not be further described.

Another embodiment is represented by FIG. 15. This apparatus is the aforementioned combination of the embodiments of FIGS. 3 and 12. It consists of three hollow bodies 4 provided with diaphragms 8 on both sides and fixed to the hollow shaft 3. Two hollow filtration bodies 36 with diaphragms 37 on both sides are located between said hollow bodies 4. The suspension enters through the inlet 42. It passes successively through spacings between the hollow bodies 4 and through the hollow filtration bodies 36 in the direction marked by the arrows, whereby the liquid phase passes through the diaphragms 8 and 37 while the solid particles are collected on the diaphragms from which they are removed by intensive agitation and readmixed with the suspension. Due to the rotation of the hollow bodies 4, no static cake is created on the diaphragms 8 and 37 whereby, due to the successive flow of suspension from the inlet 42 in conjunction with the simultaneous readmixing of particles collected on the diaphragms 8 and 37, this suspension is concentrated until a thick thixotropic slurry is created. This slurry is maintained in liquid state and discharged, as mentioned, through the valve 45. The filtrate is conducted from the hollow filtration bodies 36 by means of outlets 41 into the conduit 46. The other parts of this device are the same as in FIGURES 3 and 12.

It is also possible to adapt the inventive apparatus for a series of filtering and washing steps as shown in FIG. 13. As indicated there, reference numerals 1, 21 and 31 represent the vessels of three dynamic filtration devices. The outlet 6 of vessel 1 is connected via conduit 20 with the inlet 22 of vessel 21. In turn, the outlet 24 of vessel 21 is interconnected via conduit 26 with the inlet 27 of the vessel 31. Vessel 31 is provided with an outlet 30 for discharge of the thickened and washed slurry, and with a hollow shaft 29 for discharging the wash liquid. Similarly, vessel 21 is provided with a hollow shaft 23 through which the wash liquid of that stage is discharged. An inlet 25 permits the introduction of pure wash liquid into conduit 26. The hollow shaft of vessel 31 is interconnected via conduit 28 with a wash liquid reservoir 36 which in turn communicates via pump 32 and conduit 33 with valve 34 of conduit 20.

The operation of this embodiment will be obvious. A slurry to be filtered is continuously fed into vessel 1 at a constant rate via inlet 5. The filtrate flows off via hollow shaft 3. The remaining thickened slurry is then carried away via the outlet 6 and conduit 20 to the inlet 22 of vessel 21. Partly saturated wash liquid is fed into conduit 20 via valve 34. The mixture of thickened and not yet washed slurry with the partly saturated wash liquid newly introduced is now agitated in vessel 21 whereupon the saturated wash liquid is filtered off in the above described manner and evacuated as waste via hollow shaft 23. The partly washed and condensed slurry flows off via outlet 24 and conduit 26; in the latter it is mixed with pure wash liquid introduced via valve 25 and enters the inlet 27 of vessel 31. In this vessel the mixture is again agitated and the partly saturated wash liquid is removed through the hollow shaft 29. The now completely washed and condensed slurry is discharged from vessel 31 via the outlet 30. Upon leaving shaft 29 the partly saturated wash liquid is led away by conduit 28 to reservoir 36 from where pump 32 recycles it by way of conduit 33 into the valve 34 of conduit 20. It will be understood that the condensed slurry can be filtered and washed in $n$ stages with the aid of $n+1$ dynamic filters and that the apparatus described can be housed in a single common vessel provided with partitions, the filtration bodies to be mounted on a common hollow shaft or conduit having independent channels for carrying off the filtrate and the wash liquid, without in any way departing from the above described functional interaction of the parts of the apparatus.

A first embodiment of the invention is shown in FIG. 16 which in principle represents a multiplication of the embodiment of FIG. 3. This apparatus consists of a vessel 1 divided by two partitions 47 into three chambers. The partition 47 is sealed by its outer circumference to the inner surface of cylindrical part of the vessel 1. The other parts of this apparatus are analogous to the parts shown in FIG. 3. Also, the function of this apparatus is the same in principle as that of FIG. 3. The suspension enters continuously through the conduit 5 and is concentrated in the individual chambers through which it successively passes. The thixotropic slurry maintained in the liquid state by said agitation is discharged through the conduit 6.

It will be understood that each of the elements described above, or two or more together, may also find a useful application in other types of filtering apparatus differing from the types described above.

While the invention has been illustrated and described as embodied in a slurry filtration device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for filtering of liquids containing solid particles in suspension comprising, in combination, a housing forming a pressure vessel; inlet means in said housing for admitting thereto a liquid containing solid particles in suspension; a number of hollow stationary filter bodies disposed within said housing; a number of hollow moveable filter bodies situated between single neighboring ones of said stationary bodies; diaphragm means on said stationary bodies and on said moveable bodies for preventing the entry of said solid particles while permitting the passage of liquid into said hollow filter bodies; first conduit means communicating with the interior of said stationary filter bodies for discharging filtered fluid therefrom; second conduit means communicating with the interior of said moveable filter bodies for discharging filtered fluid therefrom; means for rotating said moveable bodies for continuously subjecting said liquid and said particles therein to an agitation requisite for causing a liquid contained therein to pass through said diaphragm means and into said stationary and moveable bodies while continuously removing and returning into suspension solid particles retained on said diaphragm means upon passage of said fluid therethrough; and outlet means communicating with said housing for removing a thickened slurry therefrom.

2. An apparatus for filtering of liquids containing solid particles in suspension comprising, in combination, a housing forming a pressure vessel; inlet means in said housing for admitting thereto a liquid containing solid particles in suspension; a number of full stationary bodies disposed within said housing; a number of hollow moveable filter bodies situated between single neighboring ones of said stationary bodies; diaphragm means on said moveable bodies for preventing the entry of said solid particles while permitting the passage of liquid into said moveable filter bodies; conduit means communicating with the interior of said moveable bodies for discharging filtered fluid therefrom; means for rotating said moveable bodies for continuously subjecting said liquid and said particles therein to an agitation requisite for causing a liquid contained therein to pass through said diaphragm means and into said moveable bodies while continuously removing and returning into suspension solid particles retained on said diaphragm means upon passage of said fluid therethrough; and outlet means communicating with said housing for removing a thickened slurry therefrom.

References Cited

UNITED STATES PATENTS

| 364,933 | 6/1887 | Hyatt | 210—331 X |
|---|---|---|---|
| 509,441 | 11/1893 | Santurio | 210—331 X |
| 1,262,146 | 4/1918 | Ward et al. | 210—297 X |
| 1,264,635 | 4/1918 | Graham | 210—331 |
| 2,332,965 | 10/1943 | Ducommun et al. | 210—70 X |
| 2,416,524 | 2/1947 | Huse et al. | 210—489 X |
| 3,157,598 | 11/1964 | Rebiscoul | 210—331 X |
| 3,178,021 | 4/1965 | Bray | 210—75 X |
| 3,190,449 | 6/1965 | Muller | 210—331 X |
| 3,241,675 | 3/1966 | Pashaian et al. | 210—77 X |

FOREIGN PATENTS 324,924   2/1930   Great Britain.

REUBEN FRIEDMAN, *Primary Examiner.*

JOHN ADEE, *Assistant Examiner.*

U.S. Cl. X.R.

210—314, 331, 391